US005101216A

United States Patent [19]

Mey et al.

[11] Patent Number: 5,101,216

[45] Date of Patent: Mar. 31, 1992

[54] XEROPRINTING USING A CORONA CHARGE INJECTION MODIFYING MATERIAL

[75] Inventors: William Mey; John W. May; William T. Gruenbaum; Susan E. Ribletty, all of Rochester; Kelly S. Robinson, Fairport; Orville C. Rodenberg, Rochester, all of N.Y.

[73] Assignee: Eastman Kodak Company, Rochester, N.Y.

[21] Appl. No.: 586,623

[22] Filed: Sep. 21, 1990

[51] Int. Cl.[5] ........................ G01D 9/00; B41M 5/025

[52] U.S. Cl. ..................................... 346/1.1; 101/466; 101/DIG. 37

[58] Field of Search ....... 101/465, 466, 489, DIG. 37; 427/14.1; 346/1.1

[56] References Cited

U.S. PATENT DOCUMENTS 2,576,047 11/1951 Schaffert ............................ 101/216
3,271,146 9/1966 Robinson ............................ 430/125
3,306,198 2/1967 Rarey ............................ 101/489
3,615,128 10/1971 Bhagat ............................ 355/272
4,465,749 8/1984 Mau et al. ............................ 430/54

FOREIGN PATENT DOCUMENTS 61-135781 6/1986 Japan .

*Primary Examiner*—Evan Lawrence
*Attorney, Agent, or Firm*—Leonard W. Treash, Jr.

[57] ABSTRACT

A xeroprinting master is formed by depositing a corona charge injection modifying material on a master substrate which includes a charge transport layer. The material can block the injection of charge that would otherwise inject into the charge transport layer or it can inject charge that would otherwise remain on the surface of the master. Preferably, the deposit is made by a conventional printer such as an ink jet, impact or thermal printer and the resulting deposit is not fused before use in xeroprinting.

17 Claims, 3 Drawing Sheets

(MODE A)

(MODE B)

XEROPRINTING USING A CORONA CHARGE INJECTION MODIFYING MATERIAL

TECHNICAL FIELD

This invention relates to xeroprinting. It is especially applicable to the use of presently available electronic printing apparatus for creation of xeroprinting masters.

BACKGROUND ART

Xeroprinting processes have been known for sometime; see, for example, U.S. Pat. Nos. 2,576,047; 3,271,146 and 3,615,128. Typically, an insulative image is formed on a conductive substrate to provide a xeroprinting master. In use, the master is repetitively charged and toned to create toner images which are transferred to receiving sheets. The xeroprinting apparatus itself is quite simple, requiring only charging, toning and transfer stations. It is capable of running at high speed. Multicolor xeroprinting apparatus has also been suggested in the literature with 3 or 4 drums, each taking a color separation xeroprinting master.

Many approaches to making xeroprinting masters have been suggested in the literature, most of them electro-photographic. In such an electro-photographic method of making a traditional xeroprinting master, a toner image is produced on a photoconductor and transferred to a conductive surface. For example, electrophotographic copiers and printers can be used to make xeroprinting masters using conductive substrates as copy sheets with an insulating toner. Alternatively, masters can be made electrophotographically by fusing a toner image to the surface of a photoconductor. In this case, the toned image acts as an optical mask, and an additional blanket exposure through the mask is required to make each print from the master.

It would be desirable to use improved and less expensive materials for the masters. It is also desirable to use less costly, simpler and presently available printing apparatus for making masters from electronic input.

Japanese Kokai 61/135781 published 23 June 1986 suggests forming a xeroprinting master by the application of either heat or pressure to the backside of an insulating sheet placed on a conductive paper. A thermal printer is used for imagewise application of heat.

U.S. Pat. No. 4,465,749 shows a method of amplifying weak electrostatic images, which method is described with respect to FIG. 1 herein. According to that method a weak electrostatic image on a photoconductor is amplified by applying a charge injection toner to form a faint toner image. The toner image is fused and the photoconductor is recharged. Charges are injected in the dark through the faint toner image to form a greatly amplified electrostatic image which can also be toned. The charge injecting toner thus has the interesting characteristic of essentially turning conductive an otherwise insulating material. The process as described in that patent requires a fusing step even if liquid developers are used to apply the charge injection toner. Example 7 of that patent suggests that the fused toner image can be used as a xeroprinting master and in fact a number of xeroprinting copies were made from it. Although the patent is directed primarily to amplifying weak electrostatic images created by optical exposure, Example 12 suggests applying the charge injection toner electrophoretically and then fusing to create a variation in charge holding ability.

U.S. Pat. No. 3,271,146 suggests use of an asymmetrical photoconductor, zinc oxide, for xeroprinting. A master is made electrophotographically with negative charge, and xeroprinting is done with positive charge. Because zinc oxide will not accept positive charge, no blanket exposure is necessary in xeroprinting.

SUMMARY OF THE INVENTION

It is an object of the invention to provide a xeroprinting master made by a method which takes advantage of presently available low-cost electronic printing systems.

It is another object of the invention to provide improved xeroprinting masters, whereby the corona-charge acceptance of a charge-transport layer is altered imagewise by deposition of a corona charge injection modifying material. Corona charge injection modifying (CCIM) materials can include inks, toners, powders, waxes, dyes, pigments, and the like.

The objects of the invention are accomplished by making a xeroprinting master by depositing a CCIM material in image configuration on the surface of a master substrate. In a preferred embodiment, the master substrate is a conventional charge-transport layer (CTL) coated on a conductive electrode. The complete master consists of the master substrate plus the imagewise CCIM deposit.

In a first mode, Mode A, the master substrate has CTL with a charge holding surface overlying a field-supporting electrode. The CCIM material, when deposited without fusing, forms with the CTL a current carrying path between the CCIM material and the electrode. The CCIM deposit renders the master substrate differentially responsive in charge holding ability after corona charging, the charge holding ability decreasing as the coverage of CCIM material on the master substrate increases.

As will be seen in Examples 1, 5 and 7, the CCIM deposit according to the first mode is a charge injecting material applied non-electrophotographically and without fusing. According to a preferred embodiment, a conventional low-cost electronic printer can be used to make it.

In a second mode, Mode B, a CTL is coated over a field supporting electrode which CTL is not chargeable under a corona charger and becomes chargeable in those places where a CCIM material is deposited, again without fusing. In this second embodiment, corona charges are injected into the free surface of the CTL and this injection is blocked by the imagewise CCIM deposit. Up to a totally blocking point, the amount of charge retention is increased as the amount of CCIM material per unit area increases.

Examples 2, 3 and 4 illustrate the xeroprinting effectiveness of Mode B. Although those examples form the xeroprinting master electrophotographically, the masters are not fused before being used for xeroprinting, illustrating that a conventional low-cost electronic printer could also be used to make the masters according to the second mode.

Thus, according to a preferred embodiment, a CCIM material is deposited in image configuration on the free surface of the master substrate using presently available electronic equipment such as, for example, ink jet printers, laser printers, electrostatographic printers, thermal transfer printers, pen plotters, impact printers, or the like.

PREFERRED MODES OF CARRYING OUT THE INVENTION

U.S. Pat. No. 4,465,749 forms part of the background for this invention and is incorporated by reference herein. FIG. 1 illustrates the basic process described in that patent of amplifying weak electrostatic images. According to FIG. 1, an imaging member 1 includes a charge holding surface layer 2 which is a conventional photoconductive layer. The charge holding surface layer 2 is coated on a field supporting electrode 3, for example, a thin layer of cuprous iodide which in turn has been coated on a suitable support, paper, polyester or the like. At step (a) the photoconductive charge holding surface layer 2 is uniformly charged. At step (b) it is imagewise exposed using very weak illumination, for example, the illumination available in an ordinary photographic camera. At step (c) the weak electrostatic image formed by step (b) is toned by application of a toner of the same polarity as the original charge thereby developing the areas of lowest charge with a faint toner image formed of charge injecting toner. At (d) the toner image is fused. At (e) the charge holding surface layer is uniformly charged to the same potential as in step (a). The charge injecting toner creates a conductive path for the charge to the supporting electrode 3 thereby dissipating a substantial amount of charge in the toner portions of the image. At (f) the resulting electrostatic image is again toned with a toner of the same polarity as the electrostatic charge creating a relatively dense image that is substantially amplified over the original image.

According to Example 7 of U.S. Pat. No. 4,465,749, the weak toner image formed at step (d) can be used as a xeroprinting master using the steps (e) and (f) and adding the step (g) of transferring the unfused toner image formed at step (f) to a receiving sheet. After transfer the element 1 is shown at (h) in the same condition it is at (d) for repeated xeroprinting.

We have found that element 1 with a weak unfused toner image as shown at (c) cannot be used in xeroprinting without additional treatment, for example, by fusing, even if the toner image is made with a liquid toner. Apparently, the residual corona charge prevents the injection of further charge. The fusing step or some other treatment step to eliminate or overcome that charge permits the xeroprinting. It would be desirable to provide a method of making a xeroprinting master which obviates the need for a separate step to overcome the inhibiting effect of the residual charge of the prior art.

Further, it would be desirable to form the masters on less expensive equipment which does not include the electrostatic image forming mechanism and a separate fusing mechanism. It would also be desirable to replace the photoconductive layer of the master in the prior art with a less expensive CTL, which would advantageously allow xeroprinting in ordinary lighting conditions rather than in the dark.

Figure 1A:
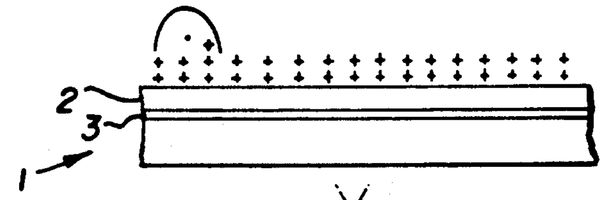
FIG. 1 is a set of schematic cross-sections 1(*a*)–1(*h*) illustrating a process of making amplified images according to the prior art.
Figure 1B:
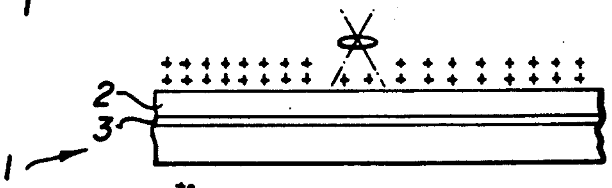
Figure 1C:
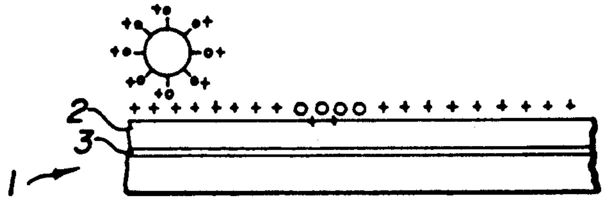
Figure 1D:
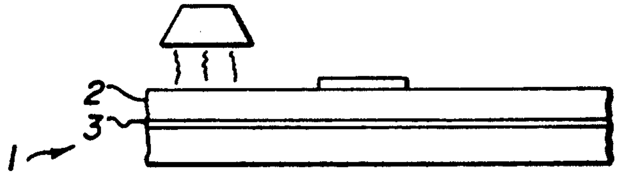
Figure 1E:
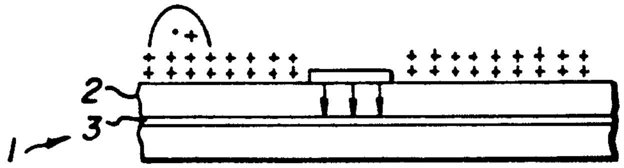
Figure 1F:
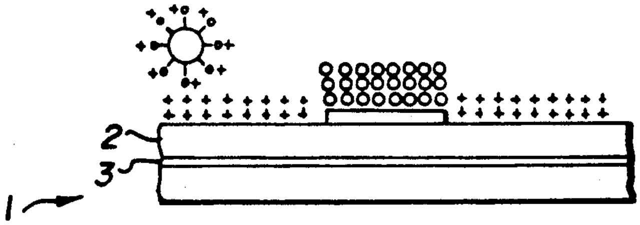
Figure 1G:
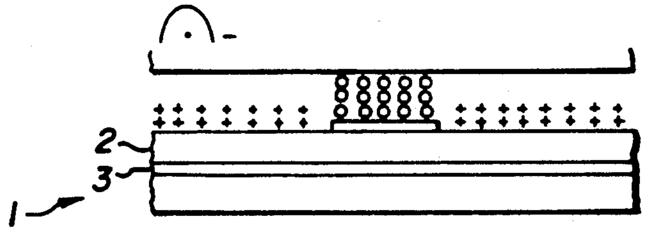
Figure 1H:
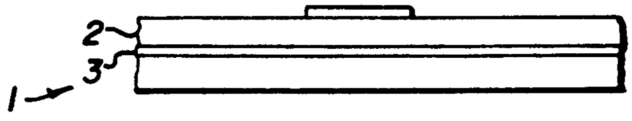
Fig. 1(h) PRIOR ART
Figure 2:
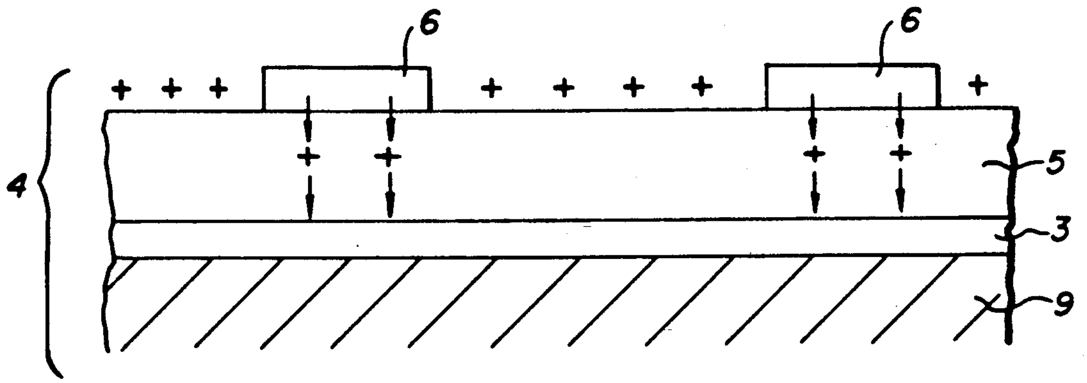
FIGS. 2 and 3 are schematic cross-sections of xeroprinting masters and illustrate two of the basic modes of practicing the invention.

FIG. 2 illustrates a xeroprinting master formed according to the first mode of practicing the invention. We call this Mode A. A master substrate 4 is comprised of a conductive electrode layer 3, a contiguous corona chargeable layer CTL 5, and an optional support layer 9. A CCIM material 6 injects charge into the CTL when the master surface is corona charged. The figure shows the case of positive corona charging, but negative corona charging, utilizing an electron transporting CTL with an electron injecting CCIM material, can also be used.

Figure 3:
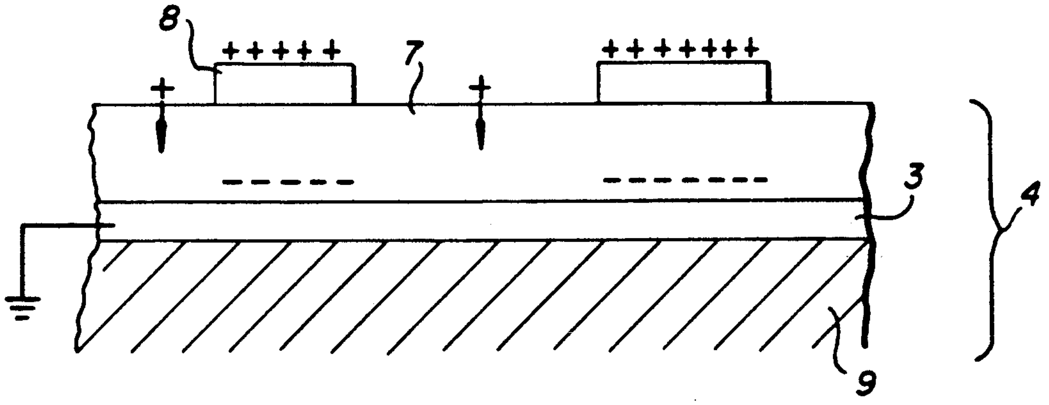

FIG. 3 illustrates a xeroprinting master constructed according to Mode B of practicing the invention. A master substrate 4 is comprised of a conductive electrode layer 3, a contiguous CTL 7 of a type which cannot be corona charged due to surface-charge injection, and an optional support layer 9. In this mode the CCIM material prevents or blocks the injection of charge when the master surface is corona charged. Again, the figure illustrates the case of positive corona charging, but negative corona charging, utilizing an electron transporting CTL which cannot be corona charged negative due to surface charge injection, can also be used with an electron blocking CCIM material.

FIG. 2 shows a xeroprinting master essentially the same in use as (d) of FIG. 1. However, on the basis of the Examples 1, 5 and 7 to be described, CCIM materials containing finely-divided carbon similar in charge-injecting properties to the toners described as useful in U.S. Pat. No. 4,465,749 perform as useful xeroprinting masters when made by a much simpler process. According to FIG. 4, a xeroprinting master comparable to that shown in (d) of FIG. 1 is obtained by the use of an ink jet head 10 which imagewise deposits an ink containing charge injecting material such as finely-divided carbon. Of course, other charge-injecting materials or compounds can be substituted for the carbon particles as the active injecting ingredient. The invention can also be practiced according to Mode B by using an ink in the ink jet head of FIG. 4 that blocks the injection of charge into the CTL layer 7 of FIG. 3 which will not accept the charge used in xeroprinting without the ink present.

Figure 4:
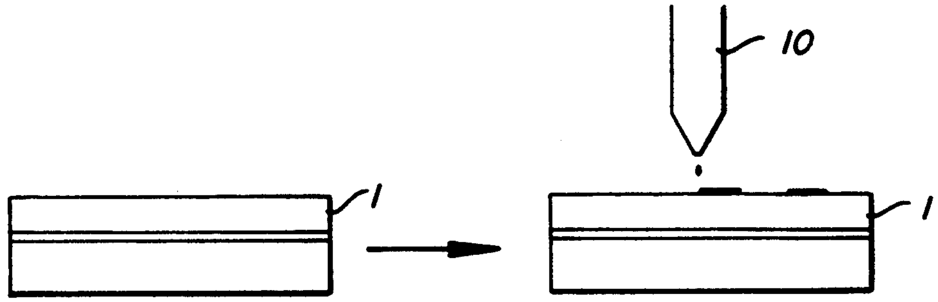
FIGS. 4, 5 and 6 are schematic side views of an apparatus for creating a xeroprinting master according to three preferred embodiments of the invention.
Figure 5:
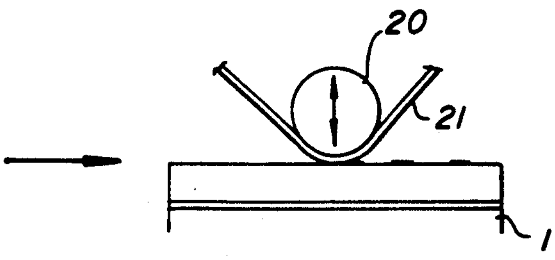
Figure 6:
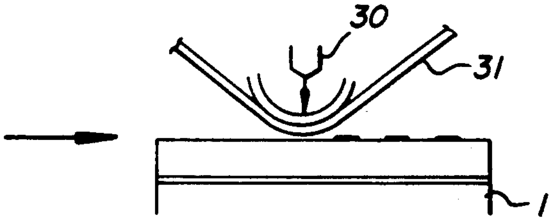

Similarly, according to FIG. 5, an impact-printing head 20 is used with an ink ribbon 21 to apply ink similar to that applied in FIG. 4, for image formation according to either Mode A or Mode B. According to FIG. 6, a thermal printhead 30 imagewise applies heat to a thermal-ink ribbon 31 to obtain the same results. Other techniques employing thermally assisted transfer of CCIM materials, for example laser thermal printing, can also be used in the present invention.

With the invention, the electrostatic image formation and the fusing steps of the prior art can be eliminated and a high quality xeroprinting master can be provided utilizing relatively inexpensive materials. More importantly, the process can be carried out by presently available, extremely low-cost printers. In addition, the CTL layers used in the invention can be cheaper, simpler in construction, and easier to use than the photoconductive layers of the prior art. Moreover, the masters produced by the invention have the advantage of being usable with or without ambient lighting conditions.

EXAMPLE 1

A non-impact thermal transfer printer was used to transfer a CCIM ink to a film receiver sheet which then became a xeroprinting master. The xeroprinting master was charged and toned resulting in a dry toner image which could be transferred. The process was repeated a number of times to provide the desired number of copies. The receiver sheet was an ordinary inverse composite multi-active photoconductive element. The photoconductive property of the sheet was not used, only the charge transporting property so that the sheet acted as a CTL with the xeroprinting done in the dark. The receiver had as its outer surface a thin layer containing a dissolved hole-transporting compound and a fluorinated oxytitanyl phthalocyanine pigment in a binder. This layer, which normally acts as a charge-generating layer, can receive holes injected by the CCIM ink but cannot accept holes from positive corona ions. Below this layer is a standard CTL containing the same hole transporting compound as the outer layer, so that holes injected into the outer layer are readily passed into the CTL and transported to the conductive electrode layer. Had the outer layer not been present, the xeroprinting could have been carried out in ordinary room light where this CTL is not photoconductive. This Example illustrates the invention practiced according to Mode A. An IBM Quietwriter, a non-impact thermal transfer printer, was used to imagewise deposit CCIM ink onto the receiver. The CCIM ink was the standard commercial material supplied with the Quietwriter and it was a thermoplastic resin pigmented with carbon black.

EXAMPLE 2

The purpose of this Example is to demonstrate Mode B of creating a master according to this invention. An electrophotographic method without fusing was used to produce the ink laydown which was an imagewise deposit of toner. It will be obvious from this Example that the CTL may be coated on an electrode and used with ink transferred by a non-electrophotographic method.

A photoconductive film was prepared by solvent coating a multi-active element comprising a 10 micron thick CTL coated over a 5 micron thick charge-generation layer (CGL) on a polyester-subbed, nickel coated poly(ethylene terephthalate) film support. The CGL contained a mixture of aggregating dyes, 4-(4-dimethylaminophenyl)-2,6-diphenyl thiopyrylium hexafluorophosphate, and 4-(4-dimethylaminophenyl)-2-(4-ethoxyphenyl)-6-phenylthiopyrylium tetrafluoroborate, and tri-4-anisylamine in a bisphenol-A-polycarbonate binder. The CTL contained 40% by weight of tri-4-anisylamine in a polyester binder of 4,4'-(2-norbornylidene)-diphenol with 40:60 molar ratio of terephthalic/azelaic acids. The tri-4-anisylamine compound was used because holes are readily injected into it from positive corona ions. Therefore this element could not be charged positively due to corona-charge injection but it could be corona charged negatively. The element was charged to a uniform negative surface potential of about −380 volts, imagewise exposed to a stepwedge and developed in a magnetic brush development station with a positively charged dry insulating toner, although a liquid developer and liquid development station could have been used. The element was then erased with white light and charged positively without fusing. In the areas where there was no toner the film charged to only about +25 volts due to corona charge injection, while in the toned areas the element charged to a high potential of +460 volts since the toner blocked hole injection into the CTL. The potential of +460 volts was close to the maximum voltage attainable with the corona charging set points used, showing that the charge blocking was very efficient.

EXAMPLE 3

The purpose of this Example is to demonstrate Mode B for creating a master according to this invention. A simpler master substrate than that of Example 2 was prepared by solvent coating a 10 micron thick CTL, containing 40% by weight of tri-4-anisylamine in a bisphenol-A-polycarbonate binder, over a nickel-coated poly(ethylene terephthalate) film support. As in Example 2, the tri-4-anisylamine compound was used because holes are readily injected into it from positive corona ions and therefore the CTL cannot be charged positively. With the rear electrode of this master substrate grounded, it was passed over a liquid development station containing a positively charged, carbon-free black liquid toner. In two different areas of the master substrate the development station was biased at two different voltages, +200 volts and +350 volts, which developed two toner patches on the master substrate with transmission densities of 0.63 and 1.03 respectively. The resulting master was corona-charged positively using a grid-controlled corona charger with the grid potential set to +500 volts. In the two areas of the master where there was toner, the xeroprinting master charged to about +450 volts, whereas in the areas where there was no toner the master charged to only about +20 volts. Dark decay between the charging station and the voltage measurement station is believed to be the reason that the surface potential of the toned areas was lower than the grid potential. It appears that the smaller thickness of the liquid-toner deposit corresponding to 0.63 transmission density is enough to completely block the injection of holes from the positive corona ions. Apparently, any additional toner coverage does not further improve charge blocking.

EXAMPLE 4

Figure 7:
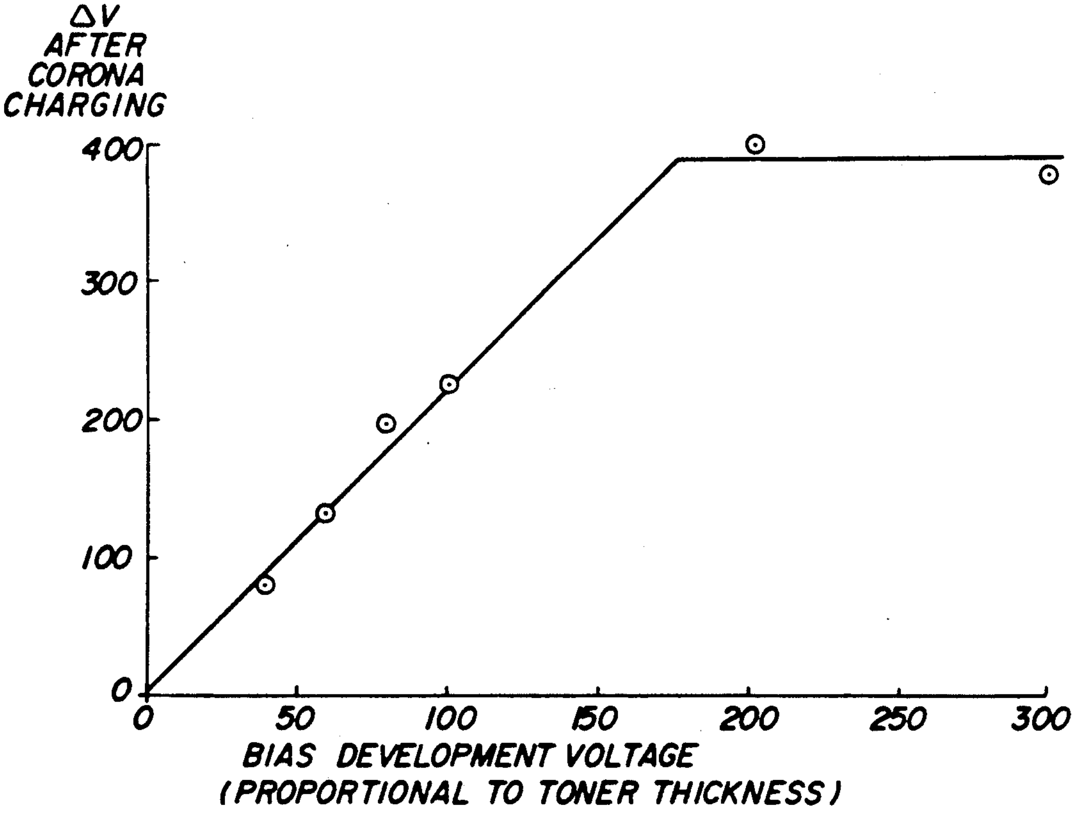
FIG. 7 is a graph taken from data from one of the examples (Example 4) illustrating an approach to obtaining a continuous tone result in the second mode of the invention.

The purpose of this Example is to demonstrate Mode B for creating a master having gray scale response according to this invention. The master substrate used in this Example was identical to the one described in Example 3 above. This master substrate was grounded and passed over a magnetic brush development station and developed with a CCIM material consisting of positively charged, insulating dry toner containing a small amount of carbon. The carbon concentration was low enough so that charge injection of holes into the film was very slow. The development station was sequentially biased at six different voltages, ranging from +40 volts to a maximum of +300 volts. The resulting toned film had six unfused toner patches of different densities corresponding to the six bias voltages. The toned film was corona-charged positively using a grid-controlled corona charger with the grid potential set to +500 volts. FIG. 7 shows the resulting surface potential as a function of bias development voltage. Toner thicknesses were proportional to the bias development voltages. The surface potential is linearly dependent upon the toner thickness up to a maximum of about +400 volts after which the surface potential is constant. This potential is lower than that in Example 3, presumably because the porosity of the unfused toner allows some corona ions to diffuse to the toner/film interface where they are able to inject holes. FIG. 7 illustrates the gray-scale capability of this invention. Gray scale was not observed in Example 3 because a multilayer deposit of toner particles was produced by the liquid developer, even at the lower optical density reported. In FIG. 7, a laydown potential of +175 volts corresponds approximately to a monolayer of the dry toner particles, so that the observed gray scale is produced by sub-monolayer coverages of toner.

EXAMPLE 5

The purpose of this Example is to demonstrate Mode A for creating a master according to this invention. A master substrate was prepared by solvent coating a 13 micron thick CTL, composed of 40% by weight of bis(4-diethylamino-2-tolyl)-phenylmethane in a poly[4,4'-(2-norbornylidene)bis phenoxy terephthalate-co-azelate] binder, over a nickel-coated poly(ethylene terephthalate) film support. A Hewlett Packard dot-matrix printer was used to transfer a CCIM ink to the master substrate described above which then became a xeroprinting master. The CCIM ink was the standard commercial material supplied with the HP 82905B dot-matrix printer. The xeroprinting master was corona charged with a grid-controlled corona charger with the grid set to approximately +500 volts. In areas of the xeroprinting master without ink the surface potential was about +500 volts, while in areas where there was CCIM material the surface potential was only about +200 volts indicative of the charge injecting properties of this ink. This latent electrostatic image was developed with a positively charged dry toner in a positively biased magnetic brush development station with the toner subsequently being transferred electrostatically to a paper receiver sheet and fused. The xeroprinting master was cleaned of residual toner and the above process of charging, toning, transferring and cleaning was repeated a number of times to make the desired number of copies. The CCIM material was subsequently removed with a pad soaked in 3A alcohol and the printing process repeated. No latent electrostatic image was measured, indicating the necessity of the charge-injecting properties of the CCIM material for xeroprinting, and also showing the possibility of reusing the master substrate.

EXAMPLE 6

This Example is a comparative example with Example 5 to show that a CTL is necessary. The dot-matrix (impact) printer of Example 5 was used to imagewise deposit the same CCIM material. A master substrate was prepared by solvent coating a 4 micron thick layer of bisphenol-A-polycarbonate over a nickel-coated poly(ethylene terephthalate) film support. This master substrate was similar to the one described in Example 5 except the bis(4-diethylamino-2-tolyl)phenylmethane was eliminated. The same process as described in Example 5 was used to test the xeroprinting properties. After corona charging, the entire surface of the printed film was equipotential, even in areas of the film with CCIM ink. Therefore, this film cannot be used as a xeroprinting substrate.

EXAMPLE 7

The purpose of this Example is to demonstrate Mode A for creating a master according to this invention. The master substrate was identical to the one described in Example 5. An IBM daisy-wheel printer was used to transfer a CCIM ink to the master substrate which then became a xeroprinting master. The CCIM ink was the standard commercial material supplied with the IBM 5210 printer. The resulting xeroprinting master was corona charged with a grid-controlled corona charger with the grid set to approximately +500 volts. In areas of the xeroprinting master without ink the surface potential was about +500 volts, while in areas where there was CCIM material the surface potential was only about +300 volts, indicative of the charge-injecting properties of this ink. The 200 volt differential of this latent electrostatic image was developed with a positively charged dry toner in a positively biased magnetic brush developer station with the toner subsequently being transferred electrostatically to a paper receiver sheet and fused. The xeroprinting master was cleaned of residual toner and the above process of charging, toning, transferring and cleaning was repeated a number of times to make the desired number of copies.

Note that many conventional electronic printers use inks that have enough carbon or other conductive material in them to inject charge into the material described in Examples 1, 5 and 7. No fusing step is necessary since the masters are not made electrophotographically. Thus, the master substrate is merely run through the conventional printer to make a master ready for xeroprinting.

If the ink does not have enough conductive material to inject charge, it can be used with the substrates of Examples 2, 3 and 4, in which, instead of injecting charge, the ink (CCIM) blocks charge injection to create the xeroprinting image. Fusing with these printing methods is also not required.

The invention has been described in detail with particular reference to a preferred embodiment thereof, but it will be understood that variations and modifications can be effected within the spirit and scope of the invention as described hereinabove and as defined in the appended claims.

We claim:

1. A method of xeroprinting comprising forming a xeroprinting master by depositing a corona charge injection blocking material on a master substrate including a charge transport layer whose ability to hold charge is modified by the presence of the corona charge injection blocking material, and using said master in xeroprinting without fusing said corona charge injection blocking material, wherein, in the xeroprinting step, said corona charge injection blocking material blocks charge from injecting into said charge transport layer and holds charge on the master surface while charge is injected into areas of the charge transport layer not covered by said blocking material.

2. The method according to claim 1 wherein said depositing is accomplished by an ink jet printer.

3. The method according to claim 1 wherein said depositing is accomplished by a thermal printer.

4. The method according to claim 1 wherein said depositing is accomplished by an impact printer.

5. A method of xeroprinting comprising forming a xeroprinting master by depositing a corona charge injecting material on a master substrate including a charge transport layer whose ability to hold charge is modified by the presence of the corona charge injecting material, and using said master in xeroprinting without fusing said corona charge injecting material, wherein, in the xeroprinting step, said corona charge injecting material injects charge into the charge transport layer while no charge is injected in areas of the master not covered by such charge injecting material.

6. The method according to claim 5 wherein said depositing is accomplished by an ink jet printer.

7. The method according to claim 5 wherein said depositing is accomplished by a thermal printer.

8. The method according to claim 5 wherein said depositing is accomplished by an impact printer.

9. A method of making a xeroprinting master comprising non-electrostatically depositing an ink in image configuration on the surface of a master material, said master material having a charge holding surface layer overlying a field supporting electrode, and said ink when deposited without fusing forming with said surface layer a current carrying path between said ink and the electrode rendering said master material differentially responsive in charge holding characteristics according to the amount of ink deposited in any portion thereof.

10. A method of making a xeroprinting master from an electronic signal representative of an image to be reproduced, comprising:

non-electrostatically depositing an ink in image configuration on the surface of a master material in response to said electrical signal, said master material having a charge holding surface layer overlying a field supporting electrode and said ink, when deposited without fusing, forming with said surface layer a current carrying path between said ink and said electrode rendering said master material differentially responsive in charge holding characteristics according to the amount of ink deposited in any portion thereof.

11. The method according to claim 10 wherein said depositing is accomplished by an ink jet printer.

12. The method according to claim 10 wherein said depositing is accomplished by a thermal printer.

13. The method according to claim 10 wherein said depositing is accomplished by an impact printer.

14. A method of xeroprinting comprising forming a xeroprinting master by imagewise depositing in response to an electronic signal a corona charge injection blocking material on a master substrate which substrate includes a charge transport layer which is normally unable to hold charge, and using said master in xeroprinting, which xeroprinting includes applying a corona charge to said master, said corona charge injection blocking material blocking charge from injecting into said charge transport layer holding charge on the master surface while charge is injected into areas of the charge transport layer not covered by said blocking material to create a developable electrostatic image.

15. The method according to claim 14 wherein said depositing is accomplished by an ink jet printer.

16. The method according to claim 14 wherein said depositing is accomplished by a thermal printer.

17. The method according to claim 14 wherein said depositing is accomplished by an impact printer.

* * * * *